United States Patent Office 3,426,066
Patented Feb. 4, 1969

3,426,066
PREPARATION OF KETONES
Robert A. Dombro, Chicago, Ill., assignor to Universal Oil Products Company, Des Plaines, Ill., a corporation of Delaware
No Drawing. Filed July 3, 1967, Ser. No. 650,585
U.S. Cl. 260—540         7 Claims
Int. Cl. C07c 49/00, 49/20, 49/76

ABSTRACT OF THE DISCLOSURE

Ketones are prepared by reacting disubstituted disulfides with water over a metal oxide catalyst at elevated temperatures and pressures to prepare the desired ketones.

---

The present invention is concerned with a process for preparing ketones, and particularly relates to a method for reacting disubstituted disulfides with water in the presence of certain catalytic compositions of matter at reaction conditions to prepare the desired products.

The reaction products of the present invention which comprise ketones will find a wide variety of uses in the commercial field. For example, ketones which possess certain configurations may be utilized as a component part of aroma chemicals which are formulated to prepare finished products which are used in perfumes, colognes, soaps, talcs, cosmetics, etc. In addition, other ketones may be used as solvents in organic reactions or as intermediates in the preparation of other organic chemicals.

It is therefore an object of this invention to prepare ketones which are useful in the chemical field.

A further object of this invention is to prepare ketones utilizing disubstituted disulfides which possess certain configurations as the starting material.

In one aspect, an embodiment of this invention resides in the process for the preparation of a ketone which comprises reacting a disulfide containing at least 1α-hydrogen and 2β-hydrogen atoms with water at an elevated temperature and pressure in the presence of a metal oxide catalyst, and recovering the resultant ketone.

A specific embodiment of this invention is found in a process which comprises reacting n-dodecyl disulfide with water at a temperature in the range of about 200° to about 300° C. and a pressure in the range of from about 2 to about 100 atmospheres, and recovering the resultant 2-dodecanone.

Other objects and embodiments will be found in the following further detailed description of this invention.

As hereinbefore set forth the present invention is concerned with a process for the preparation of ketones by reacting disubstituted disulfides of a type hereinafter further set forth in greater detail, with water at reaction conditions in the presence of a metal oxide catalyst to prepare the desired products. Examples of disubstituted disulfides are utilized as the starting material in the process of this invention comprise those disulfides which possess at least 1α-hydrogen and 2β-hydrogen atoms and possess the generic formula:

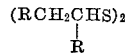

in which R may comprise hydrogen, alkyl, aromatic aralkyl, alkaryl, cycloalkyl, or any combination of these radicals.

Specific examples of these disulfides will include ethyl disulfide, n-propyl disulfide, isopropyl disulfide, n-butyl disulfide, n-pentyl disulfide, n-hexyl disulfide, n-heptyl disulfide, n-octyl disulfide, n-nonyl disulfide, n-decyl disulfide, n-undecyl disulfide, n-dodecyl disulfide, n-tridecyl disulfide, n-tetradecyl disulfide, isomers of the aforementioned n-alkyl disulfides, etc.; 2-phenylethyl disulfide, 1-phenylethyl disulfide, 1-phenylpropyldisulfide, 1-phenylbutyl disulfide, 1-phenylpentyl disulfide, ω-phenyldecyl disulfide, ω-phenyldodecyl disulfide, etc.; 1-benzylethyl disulfide, 1-benzylpropyl disulfide, 1-benzyldodecyl disulfide, etc.; 1-(p-tolyl)ethyl disulfide, 1-(tolyl)butyl disulfide, 1-(p-tolyl)octyl disulfide, 1-(p-tolyl)dodecyl disulfide, ω-(p-tolyl)decyl disulfide, ω-(p-tolyl)dodecyl disulfide, etc.; 1-cyclohexylethyl disulfide, 1-cyclohexylpropyl disulfide, 1-cyclohexylbutyl disulfide, 1-cyclohexyldecyl disulfide, 1-cyclohexyldodecyl disulfide, etc.

It is to be understood that the aforementioned disulfides are only representative of the class of compounds which may be reacted according to the process described herein, and that the present invention is not necessarily limited thereto.

The aforementioned disubstituted disulfides are reacted with water in the presence of a metal oxide catalyst. The particular metal oxide catalyst which may be used will include aluminas such as α-alumina, β-alumina, γ-alumina, η-alumina, θ-alumina, etc.; silica, magnesia, zirconia, etc.; and mixtures of these metal oxides such as silica-alumina, silica-magnesia, etc. The water which is reacted with the disubstituted disulfide is usually present in the reaction mixture in a mole excess over the disulfide in a range of from about 2:1 up to about 20:1 or more moles of water per mole of disulfide. The reaction is effected at elevated temperatures and pressures, said temperature being in a range of about 200° to about 300° C. or more and at pressures of about 2 to about 100 atmospheres or more. The pressure is usually provided for by the introduction of a subtantially inert gas such as nitrogen into the reaction vessel and will be sufficient to maintain a major pressure of the reactants in a liquid phase.

The process of this invention may be effected in any suitable manner and may comprise either a batch type or continuous manner of operation. When a batch type operation is used a quantity of the desired disulfide and water is placed in an appropriate apparatus such as, for example, a rotating, or stirred, autoclave. The autoclave is sealed and an inert gas such as nitrogen is pressed in until the desired operating pressure has been reached. The autoclave and contents thereof are then heated to the desired operating temperature and maintained thereat for a predetermined residence time which may be of from about 0.5 up to about 10 hours or more in duration. At the end of this time the autoclave and contents thereof are allowed to return to room temperature, the autoclave is vented and reaction mixture is removed. The resultant ketone which comprises the desired reaction product is separated from unreacted disulfide and water by conventional means which include fractional distillation, fractional crystallization, etc. and recovered.

It is also contemplated within the scope of this invention that the process may also be effected in a continuous manner of operation. When such a type of operation is used a reaction vessel containing the aforementioned metal oxide type of catalyst is maintained at the proper operating conditions of temperature and pressure, the latter being afforded by the use of external means such as a substantially inert gas. The feed stock comprising the disubstituted disulfide is continuously charged to the reactor as is the water. The disubstituted disulfide and the water may be charged to the reactor through separate lines, or, if desired, they may be admixed prior to entry into said reactor and charged thereto in a single stream. The particular type of catalyst which is used to catalyze the reaction of the present process will readily lend itself to a fixed bed type of reaction in which the catalyst is disposed as a fixed bed in the reactor and the reactants will be passed therethrough in either an upward or downward flow. Other types of continuous operation which may be employed with the particular type of catalyst include the moving bed type of operation in which the catalyst and the reactants are passed through reactor either concurrently or countercurrently to each other, and the slurry type of operation in which the catalyst is charged into the reactor as a slurry in either or both of the reactants. At the end of the desired residence time, the reactor effluent is continuously withdrawn from the reactor and subjected to a separation process of a conventional type whereby the desired ketone is separated from unreacted disubstituted disulfide and water, the latter two being recycled to the reactor as a portion of the feed stock, while the former is recovered.

Examples of ketones which may be prepared according to the process of this invention will include 2-butanone, 2-pentanone, 2-hexanone, 2-heptanone, 2-oxtanone, 2-nonanone, 2-decanone, 2-dodecanone, ω-phenyldodeca-2-one, etc. It is to be understood that the aforementioned ketones are only representative of the type of compounds which may be prepared and that the present invention is not necessarily limited thereto.

The following examples are given to illustrate the process of the present invention which, however, are not intended to limit the generally broad scope of said present invention in strict accordance therewith.

EXAMPLE I

In this example 0.05 mole of n-dodecyl disulfide was placed in a rotating autoclave along with one mole of water and 10 grams of alumina catalyst. The autoclave was sealed and nitrogen pressed in until an initial pressure of 30 atmospheres was reached. The autoclave and contents thereof were then heated to a temperature of about 200° C. and maintained in a range of from about 200° to about 300° C. for a period of about 5 hours. At the end of this time the autoclave and contents thereof were allowed to cool to room temperature, the excess pressure was vented and the mixture was recovered. The reaction product was separated from the catalyst by filtration and the organic phase was then separated from the water phase. After separation the organic phase was subjected to fractional distillation under reduced pressure, said distillation resulting in the isolation of 2-dodecanone together with lesser amounts of other dodecanones, the identification of the ketones being made by means of Nuclear Magnetic Resonance and Infrared analysis.

EXAMPLE II

In this example 0.07 mole of n-octyl disulfide was placed in a rotating autoclave along with 1.4 moles of water and 14 grams of alumina catalyst. The autoclave was sealed and nitrogen pressed in until an initial pressure of 30 atmospheres was reached. The autoclave was then heated to the desired operating temperature and maintained in a range of from about 200° to about 300° C. for a period of about 5 hours. At the end of this time heating was discontinued and the autoclave and contents thereof allowed to return to room temperature. Following this the excess pressure in the autoclave was vented and the reaction mixture was recovered. After separation by filtration from the catalyst, the organic layer was separated from the water layer and subjected to fractional distillation. The desired product comprising 2-octanone was isolated along with lesser amounts of other octanones, the composition of the product being identified by means of Nuclear Magnetic Resonance and Infrared analysis.

EXAMPLE III

A mixture of 0.05 mole of n-decyl disulfide and one mole of water along with 10 grams of alumina catalyst is placed in a rotating autoclave, the autoclave is sealed and nitrogen pressed in until an initial pressure of 30 atmospheres is reached. The autoclave is then heated to a temperature of about 200° C. and maintained at a range of from 200° up to about 300° C. for a period of 5 hours. At the end of the desired residence time heating is discontinued and the temperature of the autoclave is allowed to return to room temperature. Upon reaching room temperature the excess pressure which remains in the autoclave is vented and the reaction product is separated from the catalyst by filtration. The filtrate is separated into an organic layer and a water layer following which the former is subjected to fractional distillation. The distillation will result in the isolation of the desired product comprising 2-decanone along with minor amounts of isomeric decanones. The composition of the various decanones is identified by means of Nuclear Magnetic Resonance and Infrared analysis.

EXAMPLE IV

A mixture of 0.05 mole of ω-phenyldodecyl disulfide and 1.0 mole of water is placed in a rotating autoclave along with 10 grams of an alumina catalyst and thereafter sealed. The reaction mixture is treated similar to that set forth in the above example, by pressing in nitrogen until an initial pressure of 30 atmospheres is reached, heating and maintaining the autoclave at a temperature between 200° and 300° C. for a period of 5 hours. At the end of the reaction time, after venting the excess pressure the reaction product is separated from the catalyst and the water layer and is subjected to fractional distillation. The desired product comprising ω-phenyldodecan-2-one is recovered.

I claim as my invention:

1. A process for the preparation of a ketone which comprises reacting a disubstituted disulfide containing at least one α-hydrogen and two β-hydrogen atoms and in which the substituents are selected from the group consisting of alkyl, phenylalkyl, benzylalkyl, tolylalkyl and cyclohexylalkyl, with water in an amount in the range of from about 2:1 to about 20:1 of water per mole of disulfide at a temperature of from about 200° to about 300° C. and a pressure of from about 2 to about 100 atmospheres in the presence of an oxide catalyst selected from the group consisting of alumina, silica, magnesia, zirconia and mixtures thereof, and recovering the resultant ketone.

2. The process as set forth in claim 1, further characterized in that said metal oxide catalyst comprises alumina.

3. The process as set forth in claim 1, further characterized in that said metal oxide catalyst comprises silica.

4. The process as set forth in claim 1, further characterized in that said disulfide comprises n-dodecyl disulfide and said ketone comprises 2-dodecanone.

5. The process as set forth in claim 1, further characterized in that said disulfide comprises n-octyl disulfide and said ketone comprises 2-octanone.

6. The process as set forth in claim 1, further characterized in that said disulfide comprises n-decyl disulfide and said ketone comprises 2-decanone.

7. The process as set forth in claim 1, further characterized in that said disulfide comprises ω-phenyldodecyl disulfide and said ketone comprises ω-phenyldodecan-2-one.

References Cited

OTHER REFERENCES

Schoberl: Ber. Deut. Chem., 70, 1186 (1937).

DANIEL D. HORWITZ, *Primary Examiner.*

U.S. Cl. X.R.

252—364, 449, 457, 461, 463; 260—586, 593